United States Patent
Darby et al.

(10) Patent No.: US 9,880,730 B2
(45) Date of Patent: Jan. 30, 2018

(54) TOUCHSCREEN USER INTERFACE FOR PRESENTING MEDIA

(71) Applicant: Google Inc., Mountain View, CA (US)

(72) Inventors: Matthew Thomas Darby, San Francisco, CA (US); Taeho Ko, San Francisco, CA (US); Shaun Patrick Stehly, San Francisco, CA (US); Yoni Afek, San Francisco, CA (US); Nicholas Michael Kruge, San Francisco, CA (US); Kerwell Liao, San Francisco, CA (US); Clifford Curry, San Francisco, CA (US); Bryce Gibson Reid, Menlo Park, CA (US); Chad Anthony Sager, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 173 days.

(21) Appl. No.: 14/885,806

(22) Filed: Oct. 16, 2015

(65) Prior Publication Data

US 2017/0109008 A1    Apr. 20, 2017

(51) Int. Cl.
*G06F 3/0488* (2013.01)
*G06F 3/041* (2006.01)
*G06F 3/0354* (2013.01)
*G06F 3/0485* (2013.01)

(52) U.S. Cl.
CPC ........ *G06F 3/0488* (2013.01); *G06F 3/03545* (2013.01); *G06F 3/0412* (2013.01); *G06F 3/0485* (2013.01); *G06F 3/04886* (2013.01); *G06F 2203/04104* (2013.01);

(Continued)

(58) Field of Classification Search
CPC . G06F 3/0482; G06F 3/04842; G06F 3/04845
See application file for complete search history.

(56) References Cited

U.S. PATENT DOCUMENTS

| 2008/0084400 A1 | 4/2008 | Rosenberg |
| 2011/0163969 A1* | 7/2011 | Anzures .............. G06F 3/04883 345/173 |
| 2011/0167341 A1 | 7/2011 | Cranfill et al. |

(Continued)

FOREIGN PATENT DOCUMENTS

EP    2631773 A2    8/2013

OTHER PUBLICATIONS

International Search Report and Written Opinion for PCT/US2016/057116, dated Jan. 2, 2017, 15 pages.

*Primary Examiner* — Nelson Rosario
*Assistant Examiner* — Chun-Nan Lin
(74) *Attorney, Agent, or Firm* — Lowenstein Sandler LLP

(57) ABSTRACT

The subject matter of this specification can be implemented in, among other things, a method that includes providing a mid state, a fullscreen state, and a miniplayer state of a touchscreen user interface for presentation on a touchscreen device. The mid state presents a first video from a queue of videos and portions of a previous video or a next video from the queue of the videos. The fullscreen state expands the first video to fit the touchscreen user interface without presentation of the portions of the previous video or the next video. The miniplayer state shrinks the first video to fit a list of videos for a user account within the touchscreen user interface.

20 Claims, 10 Drawing Sheets

(52) U.S. Cl.
CPC ............. *G06F 2203/04803* (2013.01); *G06F 2203/04806* (2013.01); *G06F 2203/04808* (2013.01)

(56) References Cited

U.S. PATENT DOCUMENTS

| | | | |
|---|---|---|---|
| 2012/0200574 A1 | 8/2012 | Hill et al. | |
| 2013/0227414 A1* | 8/2013 | Hwang | G06F 3/0485 715/719 |
| 2013/0263001 A1* | 10/2013 | Doronichev | G06F 21/554 715/719 |
| 2014/0368734 A1* | 12/2014 | Hoffert | H04N 5/44591 348/564 |
| 2015/0040009 A1* | 2/2015 | Curry | G06F 3/017 715/719 |
| 2015/0234564 A1* | 8/2015 | Snibbe | G06F 3/0488 715/716 |

* cited by examiner

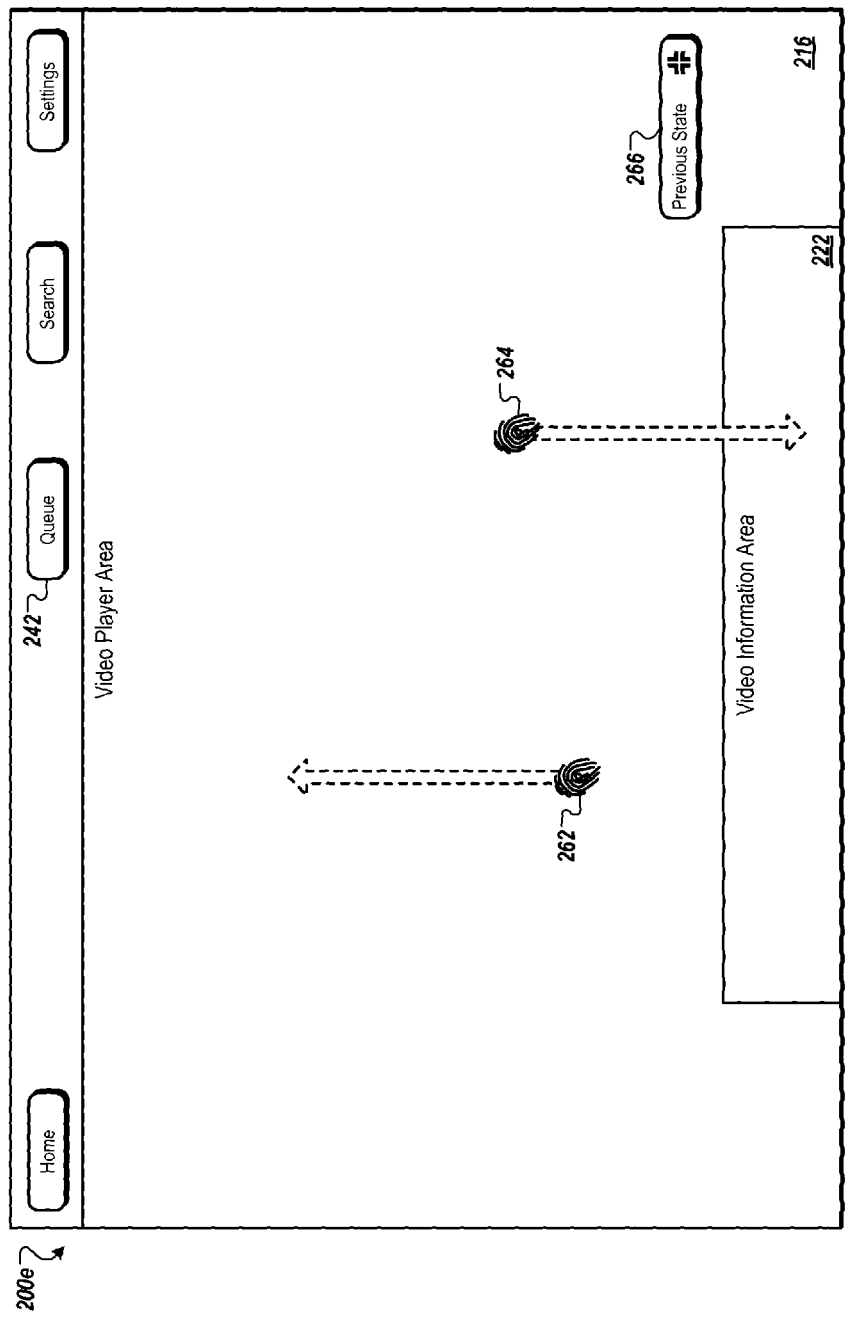

TOUCHSCREEN USER INTERFACE FOR PRESENTING MEDIA

TECHNICAL FIELD

This instant specification relates to a touchscreen user interface for presenting media.

BACKGROUND

A touchscreen is an input device layered on top of a visual display of a computing device. A user can make an input or control the computing device using single-touch or multi-touch gestures by contacting the touchscreen with a special stylus/pen or one or more fingers. Generally, the user can use the touchscreen to react to what is displayed and to control how it is displayed, for example, by panning around or zooming into what is being displayed.

SUMMARY

In one aspect, a method includes providing, by a processing device, a mid state of a touchscreen user interface for presentation on a touchscreen device. The mid state presents a first video from a queue of videos and portions of a previous video or a next video from the queue of the videos. Receipt of a first gestural input in a first direction during presentation of the mid state causes the next video to be presented in the mid state. Receipt of a second gestural input in a second direction opposite to the first direction during presentation of the mid state causes the previous video to be presented in the mid state. The method further includes providing a fullscreen state of the touchscreen user interface for presentation on the touchscreen device in response to receipt of a third gestural input during presentation of the mid state. The third gestural input is in a different direction than the first direction and the second direction or the third gestural input is of a different type than the first gestural input and the second gestural input. The fullscreen state expands the first video to fit the touchscreen user interface without presentation of the portions of the previous video or the next video. Receipt of a fourth gestural input during presentation of the fullscreen state causes the mid state to be presented again. The fourth gestural input has an opposite character as the third gestural input. Receipt of the first gestural input during presentation of the fullscreen state causes the next video to be presented in the fullscreen state. Receipt of the second gestural input during presentation of the fullscreen state causes the previous video to be presented in the fullscreen state. The method further includes providing a miniplayer state of the touchscreen user interface for presentation on the touchscreen device in response to receipt of the third gestural input during presentation of the fullscreen state. The miniplayer state shrinks the first video to fit a list of videos for a user account within the touchscreen user interface. Receipt of the fourth gestural input during presentation of the miniplayer state causes the fullscreen state to be presented again.

Implementations can include any, all, or none of the following features. The mid state further presents a list of suggested videos for the first video. The method can further include receiving a user selection of a second video among the list of suggested videos for the first video. The method can further include adding the second video to the queue in response to receipt of the user selection. The method can include replacing the first video with the second video in the mid state in response to receipt of the user selection. The method can further include replacing the portion of the previous video with a portion of the first video in the mid state in response to receipt of the user selection. The mid state further presents metadata for the first video. The method can further include sliding the metadata vertically down the touchscreen user interface as the mid state transitions to the fullscreen state without changing a size of the metadata. The method can include automatically playing the videos in the queue. The method can include automatically adding at least one suggested video to the queue after a last video in the queue. The method can include receiving a user selection of a queue control. The method can further include replacing the portions of the previous video and the next video in the mid state with a list of the videos in the queue in response to receipt of the user selection.

In one aspect, a non-transitory computer-readable medium having instructions stored thereon that, when executed by a processing device, causes the processing device to provide, by the processing device, a mid state of a touchscreen user interface for presentation on a touchscreen device. The mid state presents a first video from a queue of videos and portions of a previous video or a next video from the queue of the videos. Receipt of a first gestural input in a first direction during presentation of the mid state causes the next video to be presented in the mid state. Receipt of a second gestural input in a second direction opposite to the first direction during presentation of the mid state causes the previous video to be presented in the mid state. The instructions are further to cause the processing device to provide a fullscreen state of the touchscreen user interface for presentation on the touchscreen device in response to receipt of a third gestural input during presentation of the mid state. The third gestural input is in a different direction than the first direction and the second direction or the third gestural input is of a different type than the first gestural input and the second gestural input. The fullscreen state expands the first video to fit the touchscreen user interface without presentation of the portions of the previous video or the next video. Receipt of a fourth gestural input during presentation of the fullscreen state causes the mid state to be presented again. The fourth gestural input has an opposite character as the third gestural input. Receipt of the first gestural input during presentation of the fullscreen state causes the next video to be presented in the fullscreen state. Receipt of the second gestural input during presentation of the fullscreen state causes the previous video to be presented in the fullscreen state. The instructions are further to cause the processing device to provide a miniplayer state of the touchscreen user interface for presentation on the touchscreen device in response to receipt of the third gestural input during presentation of the fullscreen state. The miniplayer state shrinks the first video to fit a list of videos for a user account within the touchscreen user interface. Receipt of the fourth gestural input during presentation of the miniplayer state causes the fullscreen state to be presented again.

Implementations can include any, all, or none of the following features. The mid state further presents a list of suggested videos for the first video. The instructions can be further to cause the processing device to receive a user selection of a second video among the list of suggested videos for the first video. The instructions can be further to cause the processing device to add the second video to the queue in response to receipt of the user selection. The instructions can be further to cause the processing device to replace the first video with the second video in the mid state in response to receipt of the user selection. The instructions can be further to cause the processing device to replace the portion of the previous video with a portion of the first video in the mid state in response to receipt of the user selection. The mid state further presents metadata for the first video. The instructions can be further to cause the processing device to slide the metadata vertically down the touchscreen user interface as the mid state transitions to the fullscreen state without changing a size of the metadata. The instructions can be further to cause the processing device to automatically play the videos in the queue. The instructions can be further to cause the processing device to automatically add at least one suggested video to the queue after a last video in the queue. The instructions can be further to cause the processing device to receive a user selection of a queue control. The instructions can be further to cause the processing device to replace the portions of the previous video and the next video in the mid state with a list of the videos in the queue in response receipt of the user selection.

In one aspect, a system includes a memory to store instructions for a touchscreen user interface. The system further includes a processing device to execute the instructions to provide a mid state of a touchscreen user interface for presentation on a touchscreen device. The mid state presents a first video from a queue of videos and portions of a previous video or a next video from the queue of the videos. Receipt of a first gestural input in a first direction during presentation of the mid state causes the next video to be presented in the mid state. Receipt of a second gestural input in a second direction opposite to the first direction during presentation of the mid state causes the previous video to be presented in the mid state. The instructions are further to cause the processing device to provide a fullscreen state of the touchscreen user interface for presentation on the touchscreen device in response to receipt of a third gestural input during presentation of the mid state. The third gestural input is in a different direction than the first direction and the second direction or the third gestural input is of a different type than the first gestural input and the second gestural input. The fullscreen state expands the first video to fit the touchscreen user interface without presentation of the portions of the previous video or the next video. Receipt of a fourth gestural input during presentation of the fullscreen state causes the mid state to be presented again. The fourth gestural input has an opposite character as the third gestural input. Receipt of the first gestural input during presentation of the fullscreen state causes the next video to be presented in the fullscreen state. Receipt of the second gestural input during presentation of the fullscreen state causes the previous video to be presented in the fullscreen state. The instructions are further to cause the processing device to provide a miniplayer state of the touchscreen user interface for presentation on the touchscreen device in response to receipt of the third gestural input during presentation of the fullscreen state. The miniplayer state shrinks the first video to fit a list of videos for a user account within the touchscreen user interface. Receipt of the fourth gestural input during presentation of the miniplayer state causes the fullscreen state to be presented again.

Implementations can include any, all, or none of the following features. The mid state further presents a list of suggested videos for the first video. The instructions can be further to cause the processing device to receive a user selection of a second video among the list of suggested videos for the first video. The instructions can be further to cause the processing device to add the second video to the queue in response to receipt of the user selection. The instructions can be further to cause the processing device to replace the first video with the second video in the mid state in response to receipt of the user selection. The instructions can be further to cause the processing device to replace the portion of the previous video with a portion of the first video in the mid state in response to receipt of the user selection. The mid state further presents metadata for the first video. The instructions can be further to cause the processing device to slide the metadata vertically down the touchscreen user interface as the mid state transitions to the fullscreen state without changing a size of the metadata. The instructions can be further to cause the processing device to automatically add at least one suggested video to the queue after a last video in the queue. The instructions can be further to cause the processing device to receive a user selection of a queue control. The instructions can be further to cause the processing device to replace the portions of the previous video and the next video in the mid state with a list of the videos in the queue in response receipt of the user selection.

The details of one or more implementations are set forth in the accompanying drawings and the description below. Other features and advantages will be apparent from the description and drawings, and from the claims.

DESCRIPTION OF DRAWINGS

FIGS. 2A-F are examples of touchscreen user interfaces for presenting media.

DETAILED DESCRIPTION

This document describes systems and techniques for presenting media, such as videos, images, or audio, using a touchscreen user interface. A user may make gestural inputs of a first type within the touchscreen user interface, such as vertical swipes up and down, horizontal swipes left and right, single tap and double tap, pinch and spread, short press and long press, or light press and hard press to switch the interface between alternate viewing states. A user may make gestural inputs of a second type in a different direction or having a different character than the first type, such as horizontal swipes rather than vertical swipes or swipes rather than pinching, tapping, or pressing to navigate within a queue or set of media. The states include a mid state for the user interface that presents a first media along with portions of a previous media or a next media. The states also include a fullscreen state of the user interface that expands the first media to fit the space that is available within the touchscreen user interface. In addition, the states include a miniplayer state of the user interface that shrinks the media to a picture-in-picture style viewing state to provide space for searching or browsing for additional media.

The systems and techniques described here may provide one or more of the following advantages. First, the systems and techniques can provide for navigating through a queue of media more quickly by allowing a user to see portions of the queue. Second, the systems and techniques can provide for navigating through a queue of media more quickly by allowing a user to swipe to advance and review next and previous videos within a set. Third, the systems and techniques can make more efficient use of the space that is available on the touchscreen than a system that does not have the three states. This may be accomplished by reducing the number and/or types of user inputs needed to switch between a mid state for exploring a set of media, discussing media, or exploring metadata for the media; a fullscreen state for extended viewing; and a miniplayer state suited for discovering additional content.

Figure 1A:
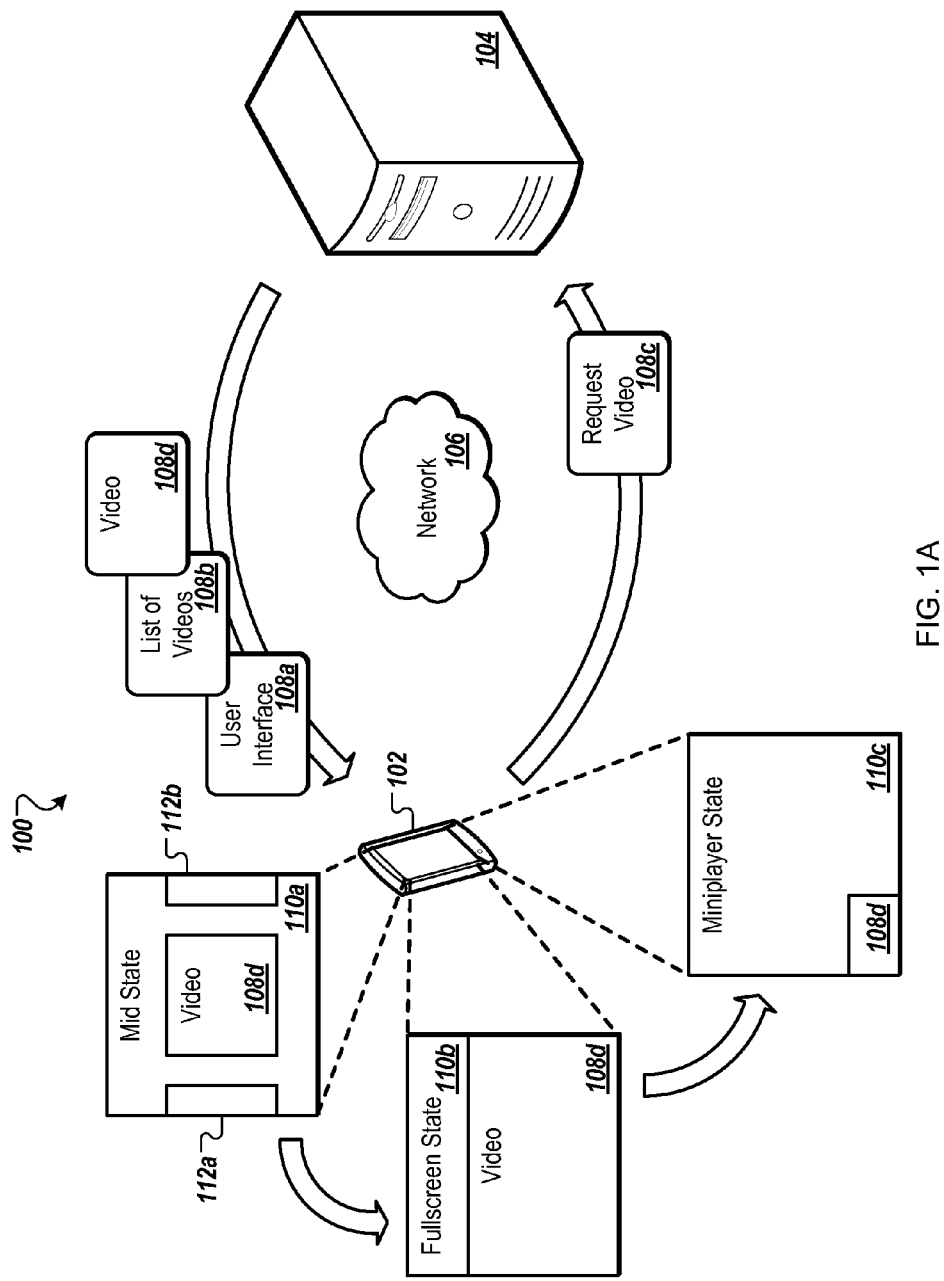
FIG. 1A is a schematic diagram that shows an example of a system for presenting media using a touchscreen user interface.

FIG. 1A is a schematic diagram that shows an example of a system 100 for presenting media using a touchscreen user interface. The system 100 includes a touchscreen device 102 in communication with a server system 104 over a network 106. The network 106 may include one or more computer devices, such as one or more of the computer devices that make up the Internet.

The touchscreen device 102 may be, for example, a tablet computer device. Alternatively, the touchscreen device 102 may be a mobile phone, a phablet, or a desktop touchscreen device. The touchscreen device 102 includes a touchscreen to display a touchscreen user interface 108a through which to receive touch-based inputs from a user.

The server system 104 provides the touchscreen user interface 108a to the touchscreen device 102 over the network 106. In some implementations, the touchscreen device 102 may have a mobile app or an application that receives data for the touchscreen user interface 108a from the server system 104. Alternatively, the server system 104 may provide the touchscreen user interface 108a to the touchscreen device 102 as a web application, such as a web page in an Internet browser application at the touchscreen device 102.

The server system 104 also provides media, such as a list of videos 108b, to the touchscreen device 102. While the example of media used here includes videos, other media may be presented by the touchscreen user interface 108a, such as images and/or audio. The server system 104 may provide the list of videos 108b to the touchscreen device 102 with the touchscreen user interface 108a or in a separate communication. For example, the server system 104 may provide the list of videos 108b to the touchscreen device 102 in response to receiving a search request from the touchscreen device 102 for videos related to one or more search terms. The server system 104 may include or have access to an index of videos and corresponding video information. The server system 104 may identify one or more videos for inclusion in the list of videos 108b that are responsive to the search request based on a search of the index.

Alternatively, the list of videos 108b may be a playlist or feed of videos provided by the server system 104 or the server system 104 may automatically suggest the videos in the list of videos 108b. In some implementations, the server system 104 ensures that a list of videos is provided to the touchscreen device 102, such as by performing a search for videos, retrieving videos from a playlist, retrieving videos from a feed for a channel, or generating suggestions for videos. For example, a user of the touchscreen device 102 may input a search for videos, select a playlist of videos, or select a channel for videos. The server system 104 then provides the list of videos 108b to the touchscreen device 102 in response to the search input, the playlist/channel selection, or automatically as a suggestion.

The touchscreen device 102 receives the list of videos 108b and presents the list of videos 108b to the user within the touchscreen user interface 108a. The touchscreen device 102 may receive a user input in the touchscreen user interface 108a selecting a video 108d. In response, the touchscreen device 102 then sends a request 108c for the video 108d to the server system 104 or another system if the video is hosted by a system that is separate from the server system 104. The server system 104, or the separate video hosting system, then provides the video 108d to the touchscreen device 102.

The touchscreen device 102 then presents the video 108d to the user within a mid state 110a of the touchscreen user interface 108a. The touchscreen user interface 108a automatically creates a queue of videos to be presented to the user within the touchscreen user interface 108a. The mid state 110a presents the video 108d in a video player, for example, within the center of the touchscreen user interface 108a. The mid state 110a also presents a portion 112a of a previous video in the queue, for example, to the left of the video 108d and a portion 112b of a next video in the queue, for example, to the right of the video 108d.

The touchscreen user interface 108a may navigate to the next video in the queue in response to receiving a first gestural input, such as swipe input to the left, from the user within the touchscreen user interface 108a. The touchscreen user interface 108a then presents the next video from the queue in the video player at the center of the touchscreen user interface 108a. The touchscreen user interface 108a may animate the transition from the video 108d to the next video by sliding the video 108d, or a thumbnail image from the video 108d, to the left to the position of the portion 112a of the previous video.

The touchscreen user interface 108a may navigate to the previous video in the queue in response to receiving a second gestural input in an opposite direction or having an opposite character as the first gestural input, such as a swipe input to the right, from the user within the touchscreen user interface 108a. The touchscreen user interface 108a then presents the previous video from the queue in the video player at the center of the touchscreen user interface 108a. The touchscreen user interface 108a may animate the transition from the video 108d to the previous video by sliding the video 108d, or a thumbnail image from the video 108d, to the right to the position of the portion 112b of the next video.

In some implementations, the touchscreen user interface 108a may exit the mid state 110a in response to receiving a fourth gestural input, such as a vertical swipe input in the upward direction, from the user within the touchscreen user interface 108a while the touchscreen user interface 108a is in the mid state 110a. For example, the touchscreen user interface 108a may go back to displaying the list of videos 108b. The fourth gestural input is in a different direction or is a different type than the first and second gestural inputs. For example, the fourth gestural input may be in a vertical direction while the first and second gestural inputs are in a horizontal direction, and vice versa. In another example, the fourth gestural input may be a pinch, tap, or press type of gestural input while the first and second gestural inputs may be swipes.

The touchscreen user interface 108a may switch from the mid state 110a to a fullscreen state 110b in response to receiving a third gestural input, such as a swipe down input, from the user within the touchscreen user interface 108a while the touchscreen user interface 108a is in the mid state 110a. The third gestural input is in an opposite direction or has an opposite character as the fourth gestural input. For example, the third gestural input may be a swipe down, a pinch, a single tap, a short press, or a soft press and the fourth gestural input may be a swipe up, a spread, a double tap, a long press, or a hard press, or vice versa. In switching to the fullscreen state 110b, the touchscreen user interface 108a expands the video 108d and the video player to a fullscreen size or to fit within the space available within the touchscreen user interface 108a. The touchscreen user interface 108a may animate the expansion of the video 108d. The touchscreen user interface 108a no longer presents the portion 112a of the previous video or the portion 112b of the next video.

The touchscreen user interface 108a may navigate to the next video in the queue while in the fullscreen state 110b in response to receiving the first gestural input from the user within the touchscreen user interface 108a. The touchscreen user interface 108a then presents the next video from the queue in the video player at the center of the touchscreen user interface 108a. The touchscreen user interface 108a may animate the transition from the video 108d to the next video by sliding the video 108d, or a thumbnail image from the video 108d, to the left to the position of the portion 112a of the previous video.

The touchscreen user interface 108a may navigate to the previous video in the queue while in the fullscreen state 110b in response to receiving the second gestural input from the user within the touchscreen user interface 108a. The touchscreen user interface 108a then presents the previous video from the queue in the video player at the center of the touchscreen user interface 108a. The touchscreen user interface 108a may animate the transition from the video 108d to the previous video by sliding the video 108d, or a thumbnail image from the video 108d, to the right to the position of the portion 112b of the next video.

The touchscreen user interface 108a may switch from the fullscreen state 110b back to the mid state 110a in response to receiving the fourth gestural input from the user within the touchscreen user interface 108a while the touchscreen user interface 108a is in the fullscreen state 110b. In switching back to the mid state 110a, the touchscreen user interface 108a shrinks the video 108d and the video player to allow the portion 112a of the previous video and the portion 112b of the next video to be presented again.

The touchscreen user interface 108a may switch from the fullscreen state 110b to a miniplayer state 110c in response to receiving the third gestural input from the user within the touchscreen user interface 108a while the touchscreen user interface 108a is in the fullscreen state 110b. In switching to the miniplayer state 110c, the touchscreen user interface 108a shrinks the video 108d and the video player to a size that is smaller than the size of the video 108d and the video player in the mid state 110a to allow a portion of the list of videos 108b to be presented along with the video 108d and the video player. The touchscreen user interface 108a may animate the contraction of the video 108d from the fullscreen state 110b to the miniplayer state 110c.

In some implementations, the touchscreen user interface 108a may navigate to the next video in the queue while in the miniplayer state 110c in response to receiving the first gestural input from the user within the touchscreen user interface 108a. The touchscreen user interface 108a then presents the next video from the queue in the video player at the center of the touchscreen user interface 108a. The touchscreen user interface 108a may animate the transition from the video 108d to the next video by sliding the video 108d, or a thumbnail image from the video 108d, to the left to the position of the portion 112a of the previous video.

In some implementations, the touchscreen user interface 108a may navigate to the previous video in the queue while in the miniplayer state 110c in response to receiving the second gestural input from the user within the touchscreen user interface 108a. The touchscreen user interface 108a then presents the previous video from the queue in the video player at the center of the touchscreen user interface 108a. The touchscreen user interface 108a may animate the transition from the video 108d to the previous video by sliding the video 108d, or a thumbnail image from the video 108d, to the right to the position of the portion 112b of the next video.

In some implementations, the touchscreen user interface 108a may exit the miniplayer state 110c in response to receiving the third gestural input from the user within the touchscreen user interface 108a while the touchscreen user interface 108a is in the miniplayer state 110c. For example, the touchscreen user interface 108a may go back to displaying the list of videos 108b without displaying the video 108d in the video player.

The touchscreen user interface 108a may switch from the miniplayer state 110c back to the fullscreen state 110b in response to receiving the fourth gestural input from the user within the touchscreen user interface 108a while the touchscreen user interface 108a is in the miniplayer state 110c. In switching to the fullscreen state 110b, the touchscreen user interface 108a expands the video 108d and the video player to a fullscreen size or to fit within the space available within the touchscreen user interface 108a. The touchscreen user interface 108a may animate the expansion of the video 108d. The touchscreen user interface 108a then no longer presents the list of videos 108b.

Figure 1B:
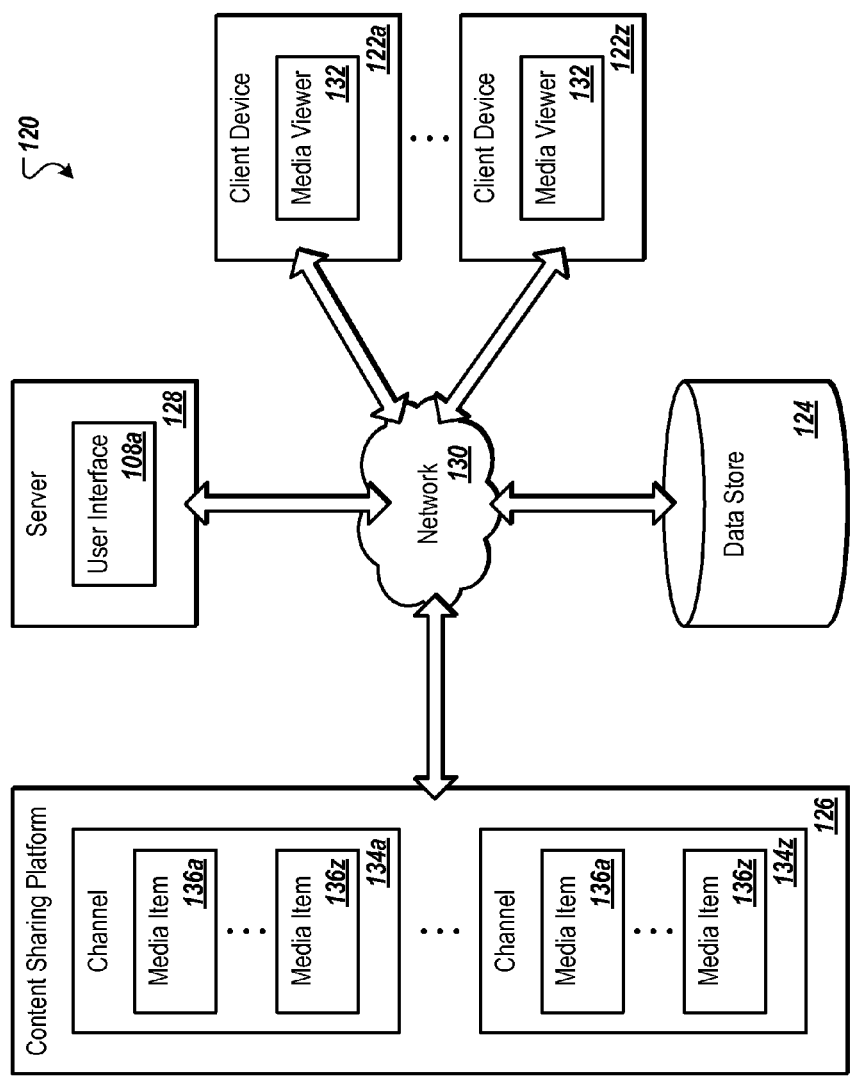
FIG. 1B is a block diagram that shows an example of a system that includes a content sharing platform for presenting media using a touchscreen user interface.

FIG. 1B is a block diagram that shows an example of a system 120 that includes a content sharing platform 126 for presenting media using a touchscreen user interface. The content sharing platform 126 is in communication with multiple client devices 122a-z, a data store 124, and a server 128 over a network 130. In one implementation, the network 130 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 124 may be a memory (e.g., random access memory), a cache, a drive (e.g., a hard drive), a flash drive, a database system, or another type of component or device capable of storing data. The data store 124 may also include multiple storage components (e.g., multiple drives or multiple databases) that may also span multiple computing devices (e.g., multiple server computers).

The client devices 122a-z may each include computing devices such as personal computers (PCs), laptops, mobile phones, smart phones, tablet computers, network connected televisions, netbook computers etc. In some implementations, the client devices 122a-z may also be referred to as "user devices." Each of the client devices 122a-z includes a media viewer 132 or player. In one implementation, the media viewer 132 may be an application that allows users to view content, such as images, videos (e.g., paid video content), web pages, documents, etc. For example, the media viewer 132 may be a web browser that can access, retrieve, present, and/or navigate content (e.g., web pages such as Hyper Text Markup Language (HTML) pages, digital media items or content items, etc.) served by a web server. The media viewer 132 may render, display, and/or present the content (e.g., a web page, a media viewer) to a user. The media viewer 132 may also display an embedded media player (e.g., a Flash® player or an HTML5 player)

that is embedded in a web page (e.g., a web page that may provide information about a product sold by an online merchant). In another example, the media viewer 132 may be a standalone application that allows users to view digital media items (e.g., digital videos, digital images, electronic books, etc.).

The media viewer 132 may be provided to the client devices 122a-z by the server 128 and/or the content sharing platform 126. For example, the media viewer 132 may be an embedded media player that is embedded in a web page provided by the content sharing platform 126. In another example, the media viewer 132 may be an application that communicates with the server 128.

In general, functions described in one implementation as being performed by the content sharing platform 126 can also be performed on the client devices 122a-z in other implementations, if appropriate. In addition, the functionality attributed to a particular component can be performed by different or multiple components operating together. The content sharing platform 126 can also be accessed as a service provided to other systems or devices through appropriate application programming interfaces, and thus is not limited to use in websites.

In one implementation, the content sharing platform 126 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as content items) and/or provide the media items to the user. For example, the content sharing platform 126 may allow a user to consume, upload, search for, approve of ("like"), dislike, and/or comment on media items. The content sharing platform 126 may also include a website (e.g., a webpage) or provide a user interface (UI) of a mobile application that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the content sharing platform 126.

The content sharing platform 126 may include multiple channels 134a-z. A channel can include content (or media items) available from a common source or content having a common topic, theme, or substance. The content can be digital content chosen by a user, digital content made available by a user, digital content uploaded by a user, digital content chosen by a content provider, digital content chosen by a broadcaster, etc. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of the channel 134a on the content sharing platform 126, feed items produced by the channel 134a may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 126 or other social networks may insert recommended content items into the user's syndicated feed, or may insert content items associated with a related connection of the user in the syndicated feed.

Each of the channels 134a-z can include one or more media items 136a-z. Examples of the media items 136a-z can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, the media items 136a-z are also referred to as videos, video content, or video content items.

The media items 136a-z may be consumed via the Internet and/or via a mobile device application. For brevity and simplicity, an online video (also hereinafter referred to as a video) is used as an example of the media items 136a-z throughout this document. As used herein, "media," media item," "online media item," "digital media," "digital media item," "content," "content item," and "video content item" can include an electronic file that can be executed or loaded using software, firmware or hardware configured to present the digital media item to an entity. In one implementation, the content sharing platform 126 may store the media items 136a-z in the data store 124.

In one implementation, the server 128 may be one or more computing devices (e.g., a rackmount server, a server computer, etc.). The server 128 may be included in the content sharing platform 126 or be part of a different system. The server 128 may be or include the server 104 which hosts or provides the touchscreen user interface 108a to the client devices 122a-z. The client devices 122a-z may be touchscreen devices, the touchscreen user interface 108a at the client devices 122a-z may include the media viewer 132. Further details with regard to the touchscreen user interface 108a are disclosed in conjunction with FIGS. 2A-F.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 126 collects user information (e.g., information about a user's social network, social actions or activities, profession, a user's preferences, a user's purchase transaction history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 126.

Figure 2A:
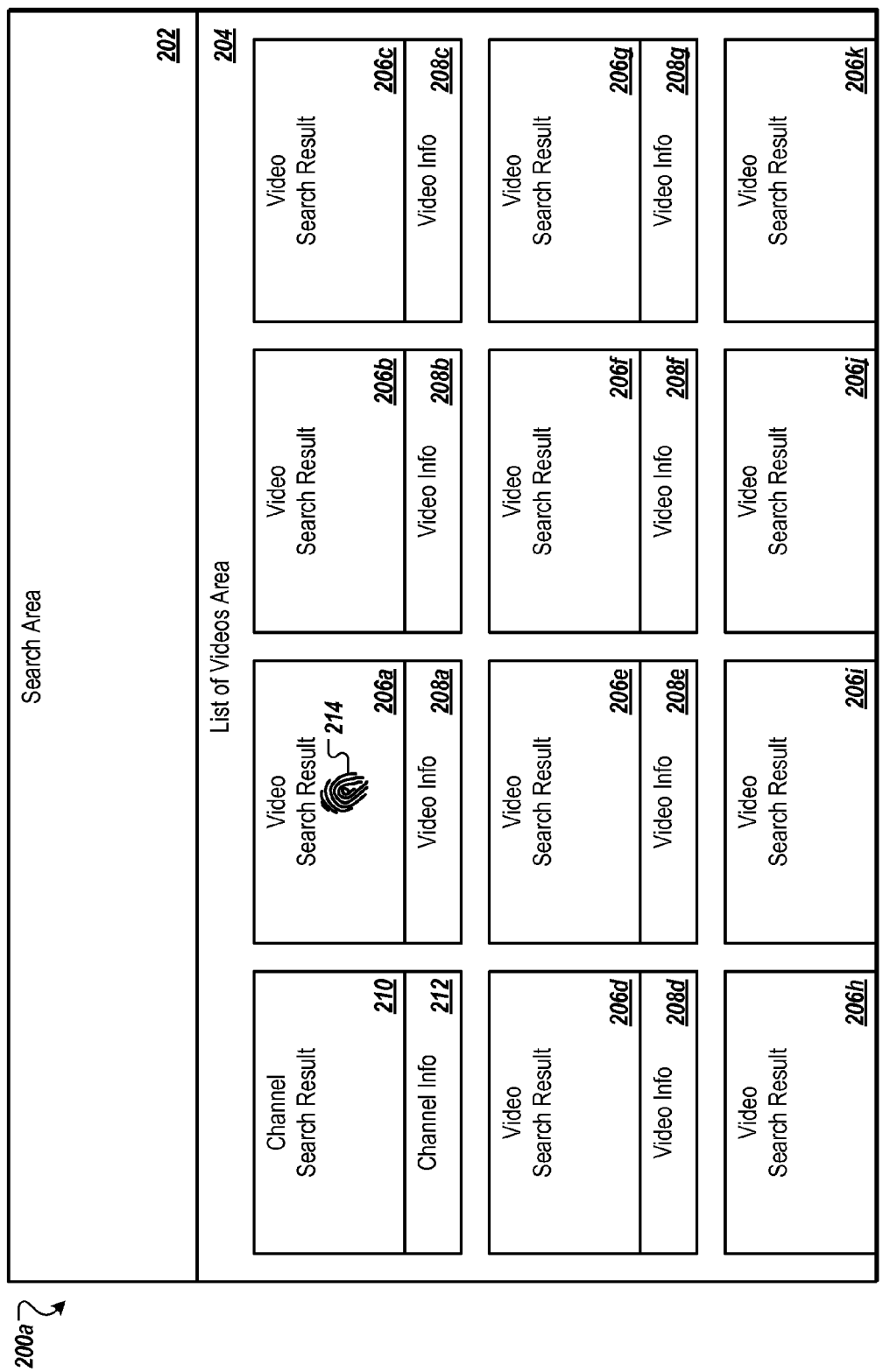

FIGS. 2A-F are examples of multiple touchscreen user interfaces 200a-f for presenting media. FIG. 2A shows an example of the touchscreen user interface 200a that presents a search area 202 and a list of videos area 204.

The touchscreen user interface 200a may receive a user input within a field in the search area 202. The user input may include one or more search terms for videos. The touchscreen user interface 200a may send the search terms to a search system, such as the server system 104, to perform a search for videos. The server system 104 may identify one or more videos in an index of videos that have data that matches the search terms. The server system 104 then provides information for one or more video search results 206a-k to the touchscreen user interface 200a. Alternatively, rather than providing the video search results 206a-k in response to a search request, the server system 104 may automatically provide the video search results 206a-k, for example, based on preferences of the user, videos previously viewed by the user, or channels subscribed to by the user.

The server system 104 may also send a plurality of video information 208a-k that corresponds to the video search results 206a-k. The video information 208a-k may include, for example, a title of each of the video search results 206a-k, a number of times each of the video search results 206a-k has been viewed, and a channel name or account name that posted each of the video search results 206a-k to the server system 104.

In addition, the server system 104 may also provide at least one channel search result 210 that is responsive to the search terms or the automatic selection. For example, the name of the channel or account may include terms that match the search terms, the channel/account may have been subscribed to by the user, the user may have viewed videos from the channel/account, or the channel/account may match preferences of the user. The server system 104 may also send some channel information 212 corresponding to the channel search result 210 to the touchscreen user interface 200a. The channel information 212 may include, for example, a name of the channel/account, a number of subscribers for the channel/account, or a number of videos posted to the server system 104 by the channel/account.

The touchscreen user interface 200a presents the video search results 206a-k, which may include the channel search result 210, within the list of videos area 204. In particular, the touchscreen user interface 200a may present thumbnail images from each of the video search results 206a-k and the video information 208a-k for each of the video search results 206a-k.

The touchscreen user interface 200a may receive an input 214, such as tap or touch input by the user on the video search results 206a within the touchscreen user interface 200a. In response, the touchscreen user interface 200a may then present the video search result 206a within a mid state of the touchscreen user interface 200b.

Figure 2B:
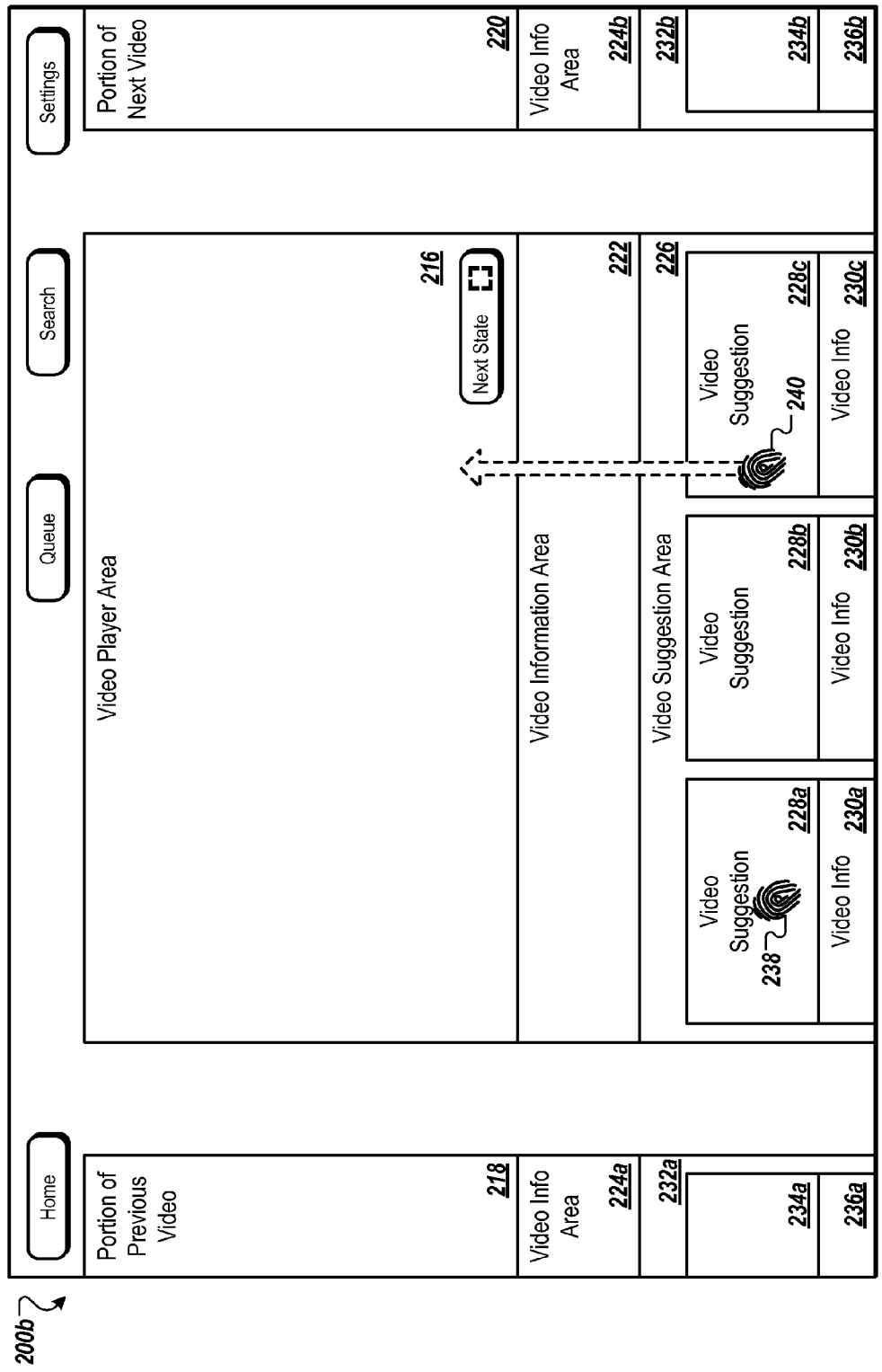

FIG. 2B shows an example of the mid state of the touchscreen user interface 200b for presenting media. The touchscreen user interface 200b presents the selected video within a video player area 216. The video player area 216 may include one or more controls that allow the user to control the playback of the video, such as play, pause, volume, mute, and a slider to control the current location of the playback. The touchscreen user interface 200b may automatically hide the controls after a timeout period and may display the controls again when the touchscreen user interface 200b receives a user input within the video player area 216. The touchscreen user interface 200b may begin playing the video within the video player area 216 automatically. Alternatively, the touchscreen user interface 200b may play the video in response to receiving a user input that selects the play control.

The touchscreen user interface 200b also presents a portion 218 of a previous video and a portion 220 of a next video in a queue of videos. The touchscreen user interface 200b may automatically create the queue upon the selection of the video search result 206a. Upon creation, the touchscreen user interface 200b may not yet present a portion for a previous video as a previous video may not exist yet within this usage session. As the touchscreen user interface 200b presents videos from the queue and as videos are added to the queue, the touchscreen user interface 200b presents the portion 218 of the previous video. Upon creation, the touchscreen user interface 200b may automatically suggest the next video for the queue.

The touchscreen user interface 200b also presents the video information 208a in a video information area 222. The video information area 222 may also present additional video information, such as a rating for the video (e.g., a number of likes and/or dislikes for the video) and controls for interacting with the video (e.g., to subscribe to a channel that posted the video, to share the video, or to input the rating or like/dislike for the video). The touchscreen user interface 200b also presents multiple portions 224a-b of video information areas corresponding to the portion 218 of the previous video and the portion 220 of the next video.

The touchscreen user interface 200b also presents a video suggestion area 226 for the current video. The video suggestion area 226 includes multiple video suggestions 228a-c and a plurality of video information 230a-c that corresponds to the video suggestions 228a-c. The touchscreen user interface 200b also presents multiple portions 232a-b of video suggestion areas, multiple portions 234a-b of video suggestions, and multiple portions of video information 236a-b for the portion 218 of the previous video and the portion 220 of the next video, respectively. The touchscreen user interface 200b may receive the video suggestions 228a-c and the portions 232a-b of the video suggestions from the server system 104. The server system 104 may select the video suggestions 228a-c based on relatedness of the video suggestions 228a-c to the current video in the video player area 216. The server system 104 may select the portions 232a-b of the video suggestions based on relatedness of the portions 232a-b of the video suggestions to the previous video and the next video, respectively.

The touchscreen user interface 200b may receive a user input 238, such as a tap or touch, on one of the video suggestions 228a-c. In response, the touchscreen user interface 200b adds the video suggestion 228a to the existing queue. The touchscreen user interface 200b may replace the portion 218 of the previous video with a portion of the existing video from the video player area 216 and the touchscreen user interface 200b may replace the existing video in the video player area 216 with the video suggestion 228a. The touchscreen user interface 200b may animate the replacement of the portion 218 of the previous video with the existing video in the video player area 216 by moving the existing video, or a thumbnail image from the existing video, to the position of the portion 218 of the previous video while moving the portion 218 of the previous video out of the touchscreen user interface 200b to the left. The touchscreen user interface 200b may animate the insertion of the video suggestion 228a into the queue, such as by expanding the gap between the video player area 216 and the portion 220 of the next video and moving the video suggestion 228a into the expanded space while also expanding the video suggestion 228a to fit the video player area 216.

The touchscreen user interface 200b may receive the first or second gestural input while in the mid state within one or more of the video player area 216, the video information area 222, or the video suggestion area 226, such as a touch that drags or swipes to the left or the right. In response, the touchscreen user interface 200b may replace the current video with the previous video or the next video, respectively, in the video player area 216. The touchscreen user interface 200b may animate the replacement of the current video with the next video by sliding the portion 218 of the previous video out of view to the left, sliding the current video from the video player area 216 into the position of the portion 218 of the previous video, and sliding the next video from the position of the portion 220 of the next video into the video player area 216. The touchscreen user interface 200b may animate the replacement of the current video with the previous video by sliding the portion 220 of the next video out of view to the right, sliding the current video from the video player area 216 into the position of the portion 220 of the next video, and sliding the previous video from the position of the portion 218 of the previous video into the video player area 216.

The touchscreen user interface 200b may receive a user input 240, such as a touch and drag or swipe upward, in the video suggestion area 226 while in the mid state. In response, the touchscreen user interface 200b may expand the video suggestion area 226.

Figure 2C:
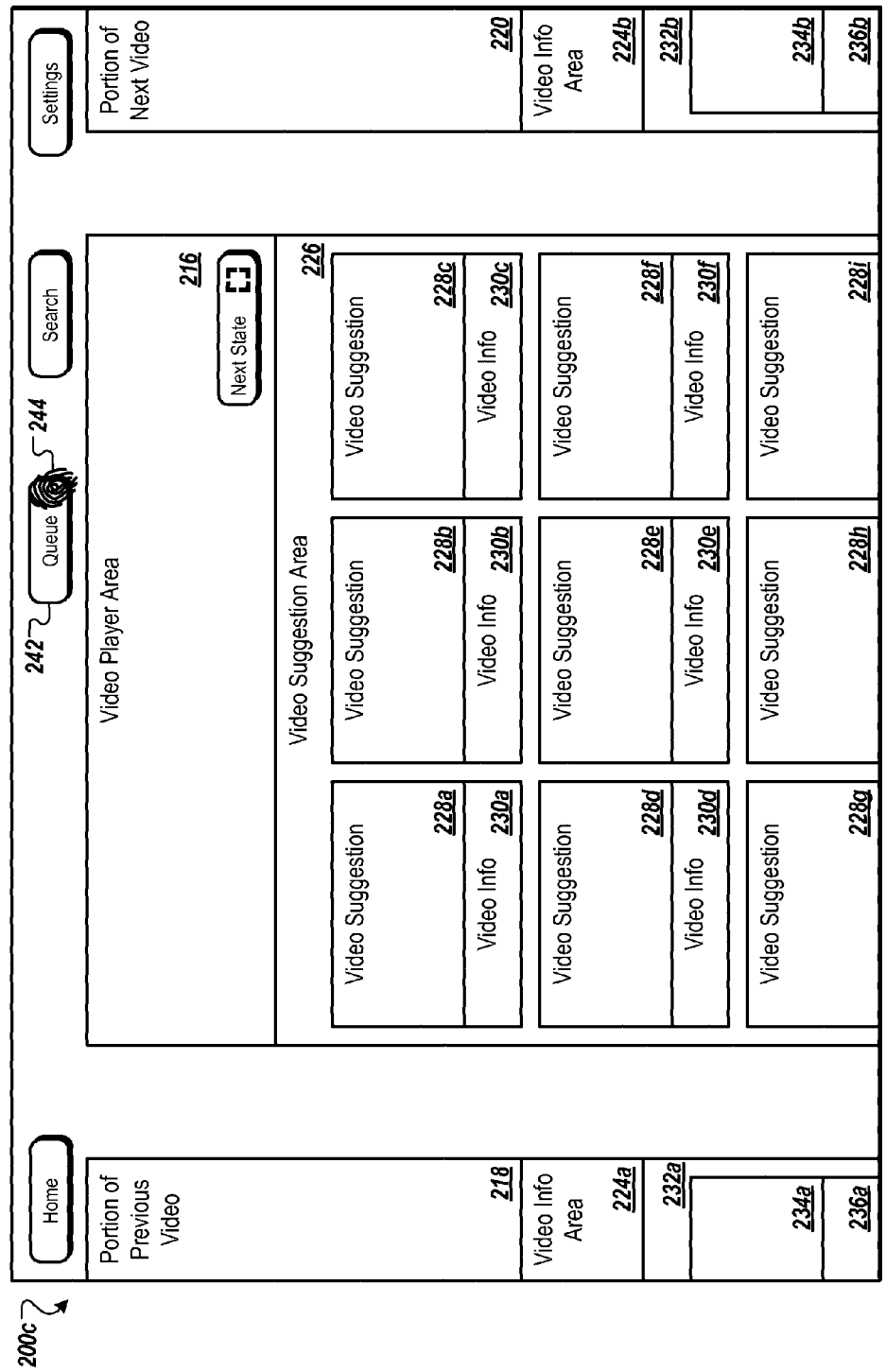

FIG. 2C shows an example of the touchscreen user interface 200c after expanding the video suggestion area 226. The touchscreen user interface 200c now includes the video suggestions 228a-c as well as multiple additional video suggestions 228d-i and multiple additional video information 230d-f in the video suggestion area 226. The touchscreen user interface 200c may animate the addition of the additional video suggestions 228d-i. For example, as the touchscreen user interface 200b receives the user input 240 that drags or swipes upward, the touchscreen user interface 200b of FIG. 2B transitions to the touchscreen user interface 200c of FIG. 2C. The video information area 222 may gradually shrink vertically as the user drags or swipes the user input 240 upward and the video suggestion area 226 expands upward. The video player area 216 may also shrink as the user drags or swipes the user input 240 upward and the video suggestion area 226 expands upward.

The touchscreen user interface 200c includes a queue control 242 that switches the mid state of the touchscreen user interface 200c to a second mode that displays the queue within the touchscreen user interface 200c rather than the portion 218 of the previous video and the portion 220 of the next video. The touchscreen user interface 200c may receive a user input 244, such as a tap or touch on the queue control 242. In response, the touchscreen user interface 200c may switch to the second mode of the mid state that displays the queue.

Figure 2D:
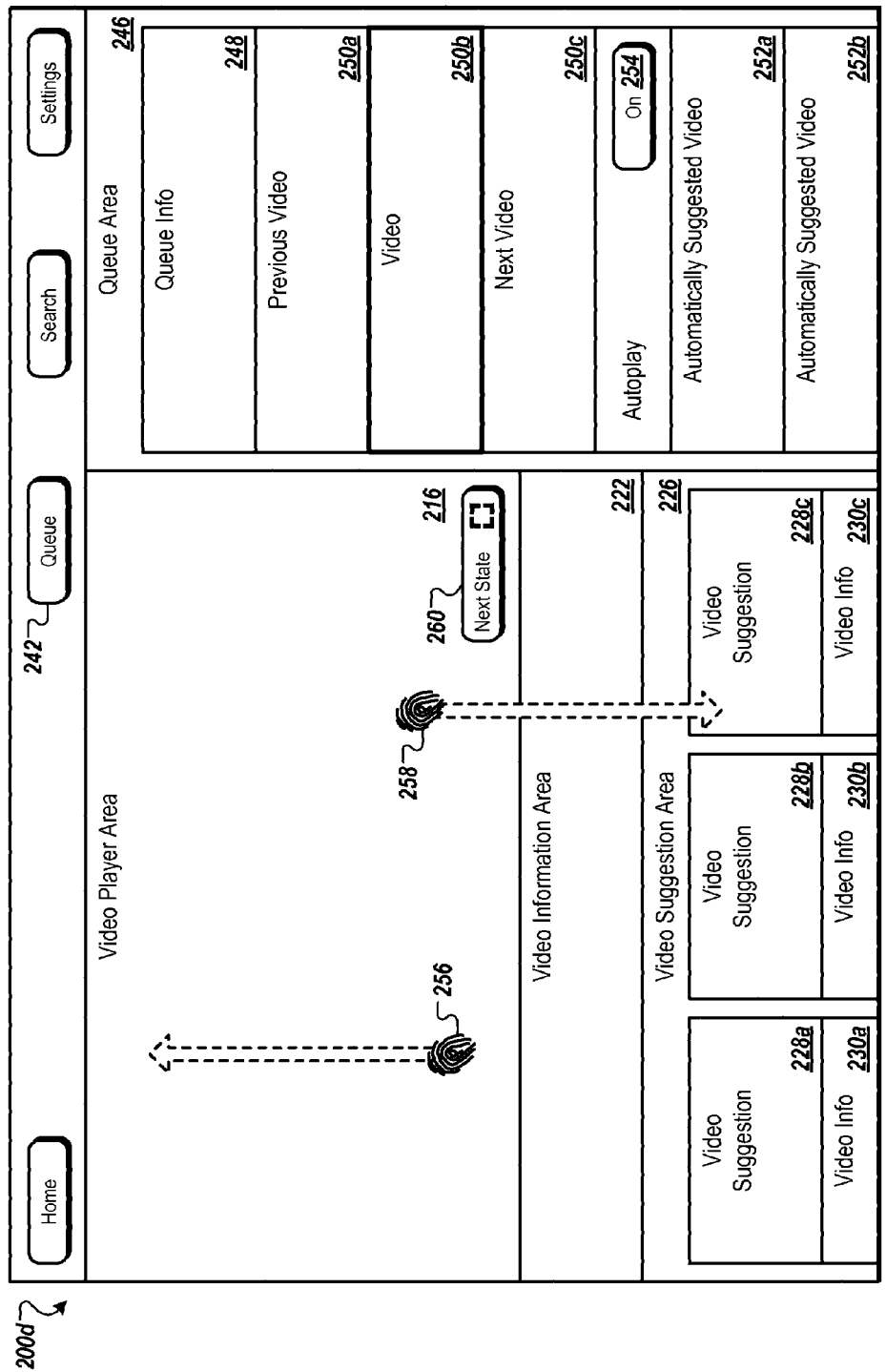

FIG. 2D shows an example of the mid state of the touchscreen user interface 200d in the second mode. The touchscreen user interface 200d no longer presents the portion 218 of the previous video or the portion 220 of the next video. The touchscreen user interface 200d now presents a queue area 246. The touchscreen user interface 200d may animate the transition between the first mode of the mid state and the second mode. For example, the touchscreen user interface 200d may gradually slide the video player area 216 and the portion 220 of the next video to the left as the portion 218 of the previous video slides out of view to the left. As this occurs, the touchscreen user interface 200d may slide the queue area 246 in from the right to gradually cover up the portion 220 of the next video. In some implementations, the touchscreen user interface 200d maintains the existing size and/or vertical position of one or more of the video player area 216, the video information area 222, the video suggestion area 226, the video suggestions 228a-c, or the video information 230a-c.

The queue area 246 includes a queue information area 248 that presents information about the queue, such a number of videos in the queue or a total duration of playing time for the videos in the queue. In addition, the queue area 246 presents a list of multiple videos 250a-c in the queue, such as the previous video, the current video, and the next video. The list may represent the videos 250a-c using thumbnail images or frames from the videos 250a-c. The list may highlight the current video, for example, using bolder lines or colors than the others of the videos 250a-c.

The queue area 246 also presents a list of one or more automatically suggested videos 252a-b. The touchscreen user interface 200d may receive the list of the automatically suggested videos 252a-b from the server system 104. The server system 104 may select the list of the automatically suggested videos 252a-b, for example, based on the videos previously viewed by the user, the preferences of the user, or channels/accounts subscribed to by the user.

The queue area 246 further includes an autoplay control 254. The touchscreen user interface 200d may automatically play the videos 250a-c in the queue and the automatically suggested videos 252 in the order shown in the queue area 246 when the autoplay control is enabled. For example, the touchscreen user interface 200d may receive user inputs to toggle between on and off states of the autoplay control 254. In response, the touchscreen user interface 200d may automatically (without any user input) play a subsequent video in the queue area 246 once the current video is done playing while in the on state or enabled state of the autoplay control 254. The touchscreen user interface 200d may continually receive suggested videos from the server system 104 to ensure that there is a subsequent video in the queue area 246 while the autoplay control 254 is enabled.

Alternatively, the touchscreen user interface 200d may receive a user input selecting one of the videos 250a-c or the automatically suggested videos 252a-b. In response, the touchscreen user interface 200d replaces the current video in the video player area 216 with the video that was selected from the videos 250a-c or the automatically suggested videos 252a-b.

The touchscreen user interface 200d may receive a user input in the second mode of the mid state within one or more of the video player area 216, the video information area 222, or the video suggestion area 226, such as a touch that drags or swipes to the left or the right. In response, the touchscreen user interface 200d may replace the current video in the video player area 216 with the previous video or the next video, respectively, from the queue. The touchscreen user interface 200d may animate the replacement of the current video with the next video by automatically scrolling the videos 250a-c in the queue area 246 downward, such as where there are too many videos in the queue area 246 to be displayed at the same time. The touchscreen user interface 200d may animate the replacement of the current video with the previous video by automatically scrolling the videos 250a-c in the queue area 246 upward, such as where there are too many videos in the queue area 246 to be displayed at the same time.

In some implementations, while in the mid state, the touchscreen user interface 200d may receive a fourth gestural input 256 within the video player area 216, such as a drag or swipe upward. In response, the touchscreen user interface 200d may exit the mid state. For example, the touchscreen user interface 200d may go back to presenting the list of videos area 204 as shown in FIG. 2A.

Alternatively, while in the mid state, the touchscreen user interface 200d may receive a third gestural input 258 within the video player area 216, such as a drag or swipe downward. In response, the touchscreen user interface 200d may switch to the fullscreen state. For example, the touchscreen user interface 200d may expand the video player area 216 to fit the available space within the touchscreen user interface 200d. The touchscreen user interface 200d moves the queue area 246 out of the touchscreen user interface 200d if in the second mode of the mid state. The touchscreen user interface 200b moves the portion 218 of the previous video and the portion 220 of the next video out of the touchscreen user interface 200b if in the first mode of the mid state.

The touchscreen user interface 200d may also present a next state control 260. The next state control 260 may include text, such as "next state," or a symbol that represents the next state, such as a fullscreen or expand symbol. The touchscreen user interface 200d may temporarily present the next state control 260 when first displaying the video player area 216 in the mid state or after an input is made within the video player area 216. In response to receiving a user selection of the next state control 260, the touchscreen user interface 200d may transition to the fullscreen state.

FIG. 2E shows an example of the fullscreen state of the touchscreen user interface 200e for presenting media. In the fullscreen state, the touchscreen user interface 200e has expanded the video player area 216 to fit the space available within the touchscreen user interface 200e, such as substantially all of the vertical height and/or horizontal width. For example, the touchscreen user interface 200e may still reserve a relatively small amount of space for a notification bar or menu that includes the queue control 242.

The touchscreen user interface 200e may also present the video information area 222. In some implementations, the touchscreen user interface 200e maintains the size and/or horizontal position of the video information area 222 when transitioning between the mid state and the fullscreen state, but slides the video information area 222 to the lower edge of the touchscreen user interface 200e while expanding the video player area 216. In some implementations, the touchscreen user interface 200e temporarily presents the video information area 222 after the transition to the fullscreen state occurs or an input is made in the video player area 216. For example, the touchscreen user interface 200e may gradually fade out the video information area 222 after a particular amount of time elapses.

The touchscreen user interface 200e may receive the first or second gestural inputs while in the fullscreen state within one or more of the video player area 216 or the video information area 222, such as a touch that drags or swipes to the left or the right. In response, the touchscreen user interface 200e may replace the current video with the previous video or the next video, respectively, in the video player area 216. The touchscreen user interface 200e may animate the replacement of the current video with the next video by sliding the current video out of the video player area 216 to the left while sliding the next video into the video player area 216 from the right. The touchscreen user interface 200e may animate the replacement of the current video with the previous video by sliding the current video out of the video player area 216 to the right while sliding the previous video into the video player area 216 from the left.

The touchscreen user interface 200e may receive a fourth gestural input 262 within the video player area 216, such as a touch that drags or swipes upward. In response, the touchscreen user interface 200e may transition back to the mid state.

The touchscreen user interface 200e may also present a previous state control 266. The previous state control 266 may include text that indicates the purpose of the control, such as "previous state," or a symbol that represents the previous state, such as a windowed screen or reduce symbol. The touchscreen user interface 200e may temporarily present the previous state control 266 when first displaying the video player area 216 in the fullscreen state or after an input is made within the video player area 216. In response to receiving a user selection of the previous state control 266, the touchscreen user interface 200d may transition back to the mid state.

The touchscreen user interface 200e may also receive a third gestural input 264 within the video player area 216, such as a touch that drags or swipes downward. In response, the touchscreen user interface 200e may transition to the miniplayer state.

Figure 2F:
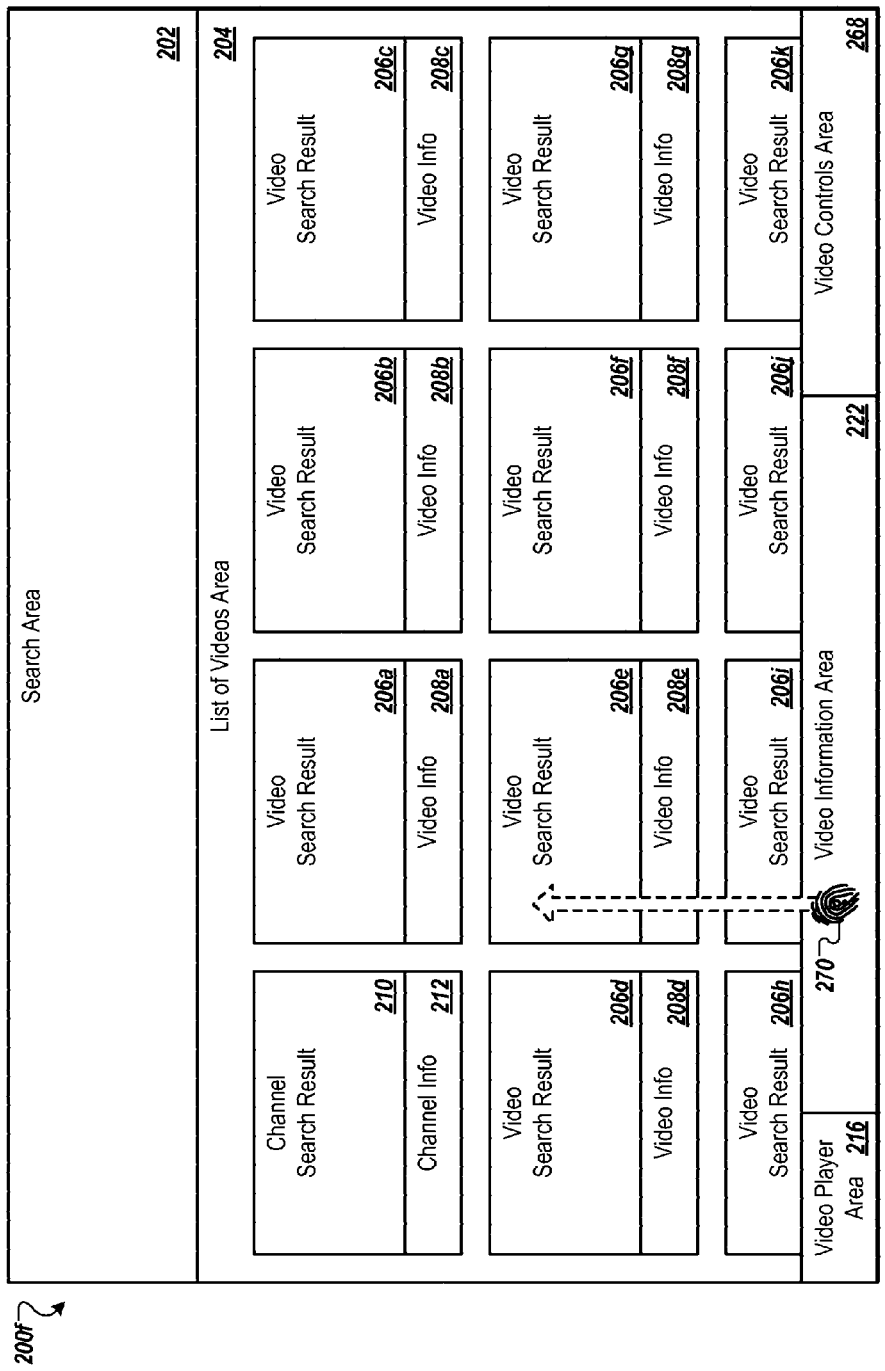

FIG. 2F shows an example of the miniplayer state of the touchscreen user interface 200f for presenting media. In the miniplayer state, the touchscreen user interface 200f has reduced the size of the video player area 216 to a small area, for example, at the lower edge of the touchscreen user interface 200f. The reduction in size of the video player area 216 in the miniplayer state allows the list of videos area 204 and/or the search area 202 to be visible in the touchscreen user interface 200f along with the video player area 216.

The touchscreen user interface 200f may also present the video information area 222 in the miniplayer state. In some implementations, the touchscreen user interface 200f maintains the size, vertical position, and/or horizontal position of the video information area between the fullscreen state and the miniplayer state. Alternatively, the touchscreen user interface 200f may also reduce the size of the video information area 222 and/or the position of the video information area 222.

The touchscreen user interface 200f may also present a video controls area 268. In some implementations, the video player area 216 is reduced in size so much that a user may no longer reliably select individual playback controls within the video player area 216. Accordingly, the video controls area 268 includes input controls that are large enough to allow the user to control playback of the video in the video player area 216 using touch inputs. For example, the controls may include play, pause, next video, previous video, or a control to exit the miniplayer state so that the video player area 216, the video information area 222, and the video controls area 268 are no longer presented. In some implementations, the touchscreen user interface 200f may not present the video player area 216 or may replace the video player area 216 with a small thumbnail image from the video currently being played. In some implementations, the touchscreen user interface 200f may continue to output audio from the current video even though the video player area 216 may be visible or even though the video player area 216 may have been replaced by the thumbnail image from the current video.

The touchscreen user interface 200f may receive a fourth gestural input 270 in the miniplayer state within one or more of the video player area 216, the video information area 222, or the video controls area 268, such as a touch that drags or swipes upward. In response, the touchscreen user interface 200f may transition from the miniplayer state back to the fullscreen state.

In some implementations, the touchscreen user interface 200f may receive the third gestural input in the miniplayer state within one or more of the video player area 216, the video information area 222, or the video controls area 268, such as a touch that drags or swipes downward. In response, the touchscreen user interface 200f may exit the miniplayer state so that the video player area 216, the video information area 222, and the video controls area 268 are no longer presented.

In some implementations, the touchscreen user interface 200f may receive the first or second inputs while in the miniplayer state within one or more of the video player area 216, the video information area 222, or the video controls area 268, such as a touch that drags or swipes to the left or the right. In response, the touchscreen user interface 200f may replace the current video with the previous video or the next video, respectively, in the video player area 216.

Figure 3:
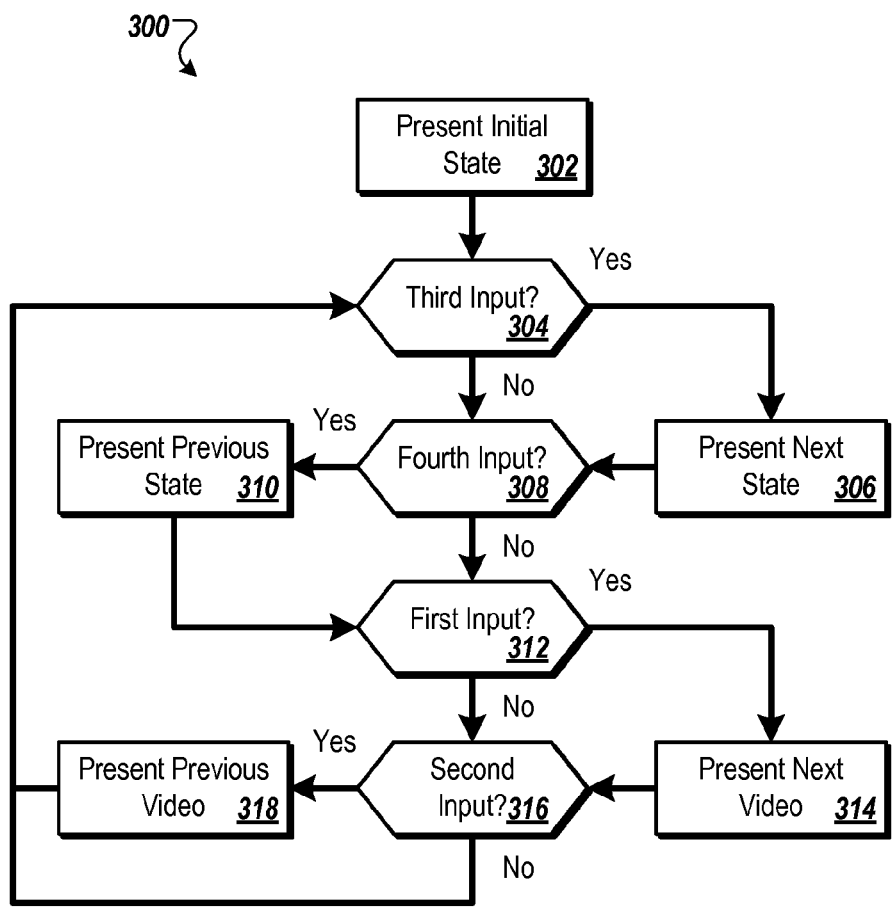
FIG. 3 is flow chart that shows an example of a process for presenting media using a touchscreen user interface.

FIG. 3 is a flow chart that shows an example of a process 300 for presenting media using a touchscreen user interface, in accordance with some aspects of the same disclosure. The process 300 may be performed, for example, by a system such as the system 100 and the touchscreen user interfaces 200a-f. For clarity of presentation, the description that follows uses the system 100 and the touchscreen user interfaces 200a-f as examples for describing the process 300. However, another system, or combination of systems, may be used to perform the process 300.

The process 300 begins, at box 302, with presenting an initial state of a touchscreen user interface for presenting media. For example, the mid state of the touchscreen user interface 200b may present the portion 218 of the previous video (if any), the video player area 216, and the portion 220 of the next video.

At box 304, if a third type of gestural input is received, then the process 300 includes, at step 306, presenting a next state of the touchscreen user interface. For example, the touchscreen user interface 200b in the first mode of the mid state or the touchscreen user interface 200d in the second mode of the mid state may receive a swipe downward and transition to the touchscreen user interface 200e in the second. In another example, the touchscreen user interface 200e in the fullscreen state may receive a swipe downward and transition to the touchscreen user interface 200f in the miniplayer state.

At box 308, if a fourth type of gestural input is received, then the process 300 includes, at box 310, presenting a previous state of the touchscreen user interface. For example, the touchscreen user interface 200d in the fullscreen state may receive a swipe upward and transition to the touchscreen user interface 200b in the first mode of the mid state or the touchscreen user interface 200d in the second mode of the mid state, depending on whether the queue is disabled or enabled, respectively. In another example, the touchscreen user interface 200f in the miniplayer state may receive a swipe upward and transition to the touchscreen user interface 200e in the fullscreen state.

At box 312, if a first type of gestural input is received, then the process 300 includes, at box 314, presenting a next video from a queue. For example, the touchscreen user interface 200b in the first mode of the mid state, the touchscreen user interface 200d in the second mode of the mid state, the touchscreen user interface 200e in the fullscreen state, and/or the touchscreen user interface 200f in the miniplayer state may receive a swipe to the left and replace the current video in the video player area 216 with the next video from the queue.

At box 316, if a second type of gestural input is received, then the process 300 includes, at box 318, presenting a previous video from a queue. For example, the touchscreen user interface 200b in the first mode of the mid state, the touchscreen user interface 200d in the second mode of the mid state, the touchscreen user interface 200e in the fullscreen state, and/or the touchscreen user interface 200f in the miniplayer state may receive a swipe to the right and replace the current video in the video player area 216 with the previous video from the queue.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term "article of manufacture," as used herein, is intended to encompass a computer program accessible from a computer-readable device or storage media.

Figure 4:
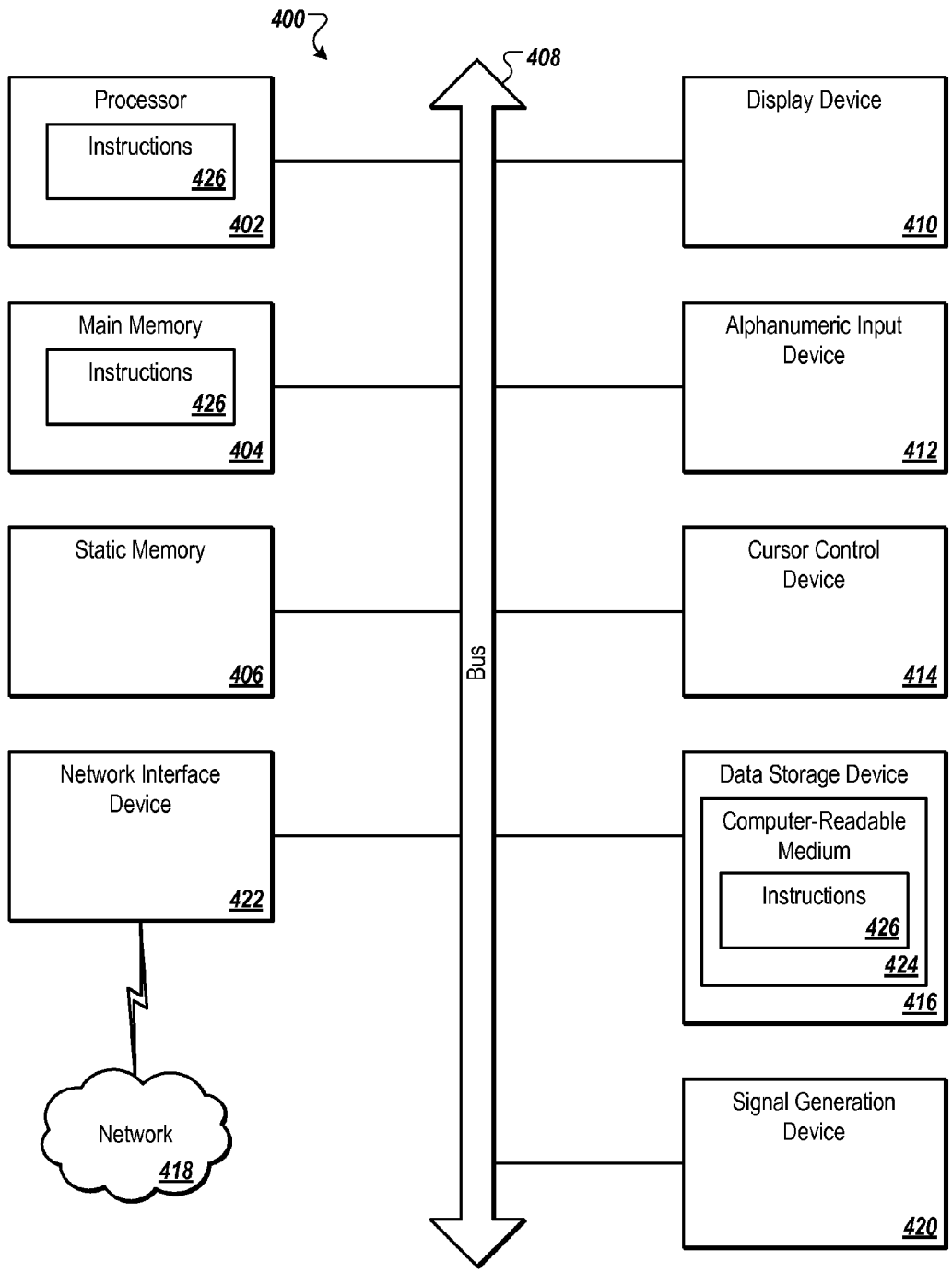
FIG. 4 is a schematic diagram that shows an example of a computer system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the system 100 and the touchscreen user interfaces 200a-f for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the system 100, the system 120, and the touchscreen user interfaces 200a-f embodying any one or more of the methodologies or functions described herein. The sets of instructions 426 of the system 100, the system 120, and the touchscreen user interfaces 200a-f may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

providing, by a processing device, a mid state of a touchscreen user interface for presentation on a touchscreen device, wherein the mid state presents a first video from a queue of videos and portions of a previous video or a next video from the queue of the videos, wherein receipt of a first gestural input in a first direction during presentation of the mid state causes the next video to be presented in the mid state, and wherein receipt of a second gestural input in a second direction opposite to the first direction during presentation of the mid state causes the previous video to be presented in the mid state;

providing a fullscreen state of the touchscreen user interface for presentation on the touchscreen device in response to receipt of a third gestural input during presentation of the mid state, wherein the third gestural input is in a third direction that is different than the first direction and the second direction, or the third gestural input is of a second type that is different than a first type of the first gestural input and the second gestural input, wherein the fullscreen state expands the first video to fit the touchscreen user interface without presentation of the portions of the previous video or the next video, wherein receipt of a fourth gestural input during presentation of the fullscreen state causes the mid state to be presented again, wherein the fourth gestural input has an opposite character as the third gestural input, wherein receipt of the first gestural input during presentation of the fullscreen state causes the next video to be presented in the fullscreen state, and wherein receipt of the second gestural input during presentation of the fullscreen state causes the previous video to be presented in the fullscreen state; and providing a miniplayer state of the touchscreen user interface for presentation on the touchscreen device in response to receipt of the third gestural input during presentation of the fullscreen state, wherein the miniplayer state shrinks the first video to fit a list of videos for a user account within the touchscreen user interface, wherein receipt of the fourth gestural input during presentation of the miniplayer state causes the fullscreen state to be presented again.

2. The method of claim 1, wherein the mid state further presents a list of suggested videos for the first video, and wherein the method further comprises:

receiving a user selection of a second video among the list of suggested videos for the first video; and adding the second video to the queue in response to receipt of the user selection.

3. The method of claim 2, further comprising:

replacing the first video with the second video in the mid state in response to receipt of the user selection; and replacing the portion of the previous video with a portion of the first video in the mid state in response to receipt of the user selection.

4. The method of claim 1, wherein the mid state further presents metadata for the first video, and wherein the method further comprises:

sliding the metadata vertically down the touchscreen user interface as the mid state transitions to the fullscreen state without changing a size of the metadata.

5. The method of claim 1, further comprising:
automatically playing the videos in the queue.

6. The method of claim 1, further comprising:
automatically adding at least one suggested video to the queue after a last video in the queue.

7. The method of claim 1, further comprising:
receiving a user selection of a queue control; and
replacing the portions of the previous video and the next video in the mid state with a list of the videos in the queue in response to receipt of the user selection.

8. A non-transitory computer-readable medium having instructions stored thereon that, when executed by a processing device, cause the processing device to:

provide, by the processing device, a mid state of a touchscreen user interface for presentation on a touchscreen device, wherein the mid state presents a first video from a queue of videos and portions of a previous video or a next video from the queue of the videos, wherein receipt of a first gestural input in a first direction during presentation of the mid state causes the next video to be presented in the mid state, and wherein receipt of a second gestural input in a second direction opposite to the first direction during presentation of the mid state causes the previous video to be presented in the mid state;

provide a fullscreen state of the touchscreen user interface for presentation on the touchscreen device in response to receipt of a third gestural input during presentation of the mid state, wherein the third gestural input is in a third direction that is different than the first direction and the second direction or the third gestural input is of a second type that is different than a first type of the first gestural input and the second gestural input, wherein the fullscreen state expands the first video to fit the touchscreen user interface without presentation of the portions of the previous video or the next video, wherein receipt of a fourth gestural input during presentation of the fullscreen state causes the mid state to be presented again, wherein the fourth gestural input has an opposite character as the third gestural input, wherein receipt of the first gestural input during presentation of the fullscreen state causes the next video to be presented in the fullscreen state, and wherein receipt of the second gestural input during presentation of the fullscreen state causes the previous video to be presented in the fullscreen state; and provide a miniplayer state of the touchscreen user interface for presentation on the touchscreen device in response to receipt of the third gestural input during presentation of the fullscreen state, wherein the miniplayer state shrinks the first video to fit a list of videos for a user account within the touchscreen user interface, wherein receipt of the fourth gestural input during presentation of the miniplayer state causes the fullscreen state to be presented again.

9. The non-transitory computer-readable medium of claim 8, wherein the mid state further presents a list of suggested videos for the first video, and wherein the instructions are further to cause the processing device to:

receive a user selection of a second video among the list of suggested videos for the first video; and add the second video to the queue in response to receipt of the user selection.

10. The non-transitory computer-readable medium of claim 9, wherein the instructions are further to cause the processing device to:
  replace the first video with the second video in the mid state in response to receipt of the user selection; and
  replace the portion of the previous video with a portion of the first video in the mid state in response to receipt of the user selection.

11. The non-transitory computer-readable medium of claim 8, wherein the mid state further presents metadata for the first video, and wherein the instructions are further to cause the processing device to:
  slide the metadata vertically down the touchscreen user interface as the mid state transitions to the fullscreen state without changing a size of the metadata.

12. The non-transitory computer-readable medium of claim 8, wherein the instructions are further to cause the processing device to:
  automatically play the videos in the queue.

13. The non-transitory computer-readable medium of claim 8, wherein the instructions are further to cause the processing device to:
  automatically add at least one suggested video to the queue after a last video in the queue.

14. The non-transitory computer-readable medium of claim 8, wherein the instructions are further to cause the processing device to:
  receive a user selection of a queue control; and
  replace the portions of the previous video and the next video in the mid state with a list of the videos in the queue in response receipt of the user selection.

15. A system comprising:
  a memory to store instructions for a touchscreen user interface; and
  a processing device to execute the instructions to:
    provide a mid state of the touchscreen user interface for presentation on a touchscreen device, wherein the mid state presents a first video from a queue of videos and portions of a previous video or a next video from the queue of the videos, wherein receipt of a first gestural input in a first direction during presentation of the mid state causes the next video to be presented in the mid state, and wherein receipt of a second gestural input in a second direction opposite to the first direction during presentation of the mid state causes the previous video to be presented in the mid state;
    provide a fullscreen state of the touchscreen user interface for presentation on the touchscreen device in response to receipt of a third gestural input during presentation of the mid state, wherein the third gestural input is in a third direction that is different than the first direction and the second direction, or the third gestural input is of a second type that is different than a first type of the first gestural input and the second gestural input, wherein the fullscreen state expands the first video to fit the touchscreen user interface without presentation of the portions of the previous video or the next video, wherein receipt of a fourth gestural input during presentation of the fullscreen state causes the mid state to be presented again, wherein the fourth gestural input has an opposite character as the third gestural input, wherein receipt of the first gestural input during presentation of the fullscreen state causes the next video to be presented in the fullscreen state, and wherein receipt of the second gestural input during presentation of the fullscreen state causes the previous video to be presented in the fullscreen state; and
    provide a miniplayer state of the touchscreen user interface for presentation on the touchscreen device in response to receipt of the third gestural input during presentation of the fullscreen state, wherein the miniplayer state shrinks the first video to fit a list of videos for a user account within the touchscreen user interface, wherein receipt of the fourth gestural input during presentation of the miniplayer state causes the fullscreen state to be presented again.

16. The system of claim 15, wherein the mid state further presents a list of suggested videos for the first video, and wherein the instructions are further to cause the processing device to:
  receive a user selection of a second video among the list of suggested videos for the first video; and
  add the second video to the queue in response to receipt of the user selection.

17. The system of claim 16, wherein the instructions are further to cause the processing device to:
  replace the first video with the second video in the mid state in response to receipt of the user selection; and
  replace the portion of the previous video with a portion of the first video in the mid state in response to receipt of the user selection.

18. The system of claim 15, wherein the mid state further presents metadata for the first video, and wherein the instructions are further to cause the processing device to:
  slide the metadata vertically down the touchscreen user interface as the mid state transitions to the fullscreen state without changing a size of the metadata.

19. The system of claim 15, wherein the instructions are further to cause the processing device to:
  automatically add at least one suggested video to the queue after a last video in the queue.

20. The system of claim 15, wherein the instructions are further to cause the processing device to:
  receive a user selection of a queue control; and
  replace the portions of the previous video and the next video in the mid state with a list of the videos in the queue in response receipt of the user selection.

* * * * *